United States Patent [19]
Hashizume et al.

[11] Patent Number: 5,626,305
[45] Date of Patent: May 6, 1997

[54] TAPE CASSETTE HAVING RIBS AND WINDOW

[75] Inventors: Kenji Hashizume, Miyota-machi; Masatoshi Okamura, Saku; Haruo Shiba, Komoro, all of Japan

[73] Assignee: TDK Corporation, Tokyo, Japan

[21] Appl. No.: 272,620

[22] Filed: Jul. 11, 1994

Related U.S. Application Data

[63] Continuation of Ser. No. 987,599, Dec. 9, 1992, abandoned.

[30] Foreign Application Priority Data

| Dec. 9, 1991 | [JP] | Japan | 3-108901 U |
| Dec. 9, 1991 | [JP] | Japan | 3-108902 U |
| Dec. 9, 1991 | [JP] | Japan | 3-108903 U |
| Dec. 9, 1991 | [JP] | Japan | 3-108904 U |
| Dec. 9, 1991 | [JP] | Japan | 3-108905 U |
| Dec. 27, 1991 | [JP] | Japan | 3-112790 U |

[51] Int. Cl.$^6$ .......................... G11B 23/04; G03B 23/02
[52] U.S. Cl. .............. 242/347; 242/345.3; 242/346; 360/132
[58] Field of Search .................. 242/199, 347, 242/345, 345.3, 346; 360/132

[56] References Cited

U.S. PATENT DOCUMENTS

| 3,596,006 | 7/1971 | Lawhon | 360/132 |
| 4,174,080 | 11/1979 | Yamada | 242/199 |
| 4,306,663 | 12/1981 | Gelardi et al. | 242/199 |
| 4,387,864 | 6/1983 | Posso | 242/199 |
| 4,484,719 | 11/1984 | Schoenmakers | 242/199 |
| 4,560,117 | 12/1985 | Shimizu | 242/199 |
| 4,682,258 | 7/1987 | Satoh et al. | 242/347 |
| 4,802,045 | 1/1989 | Yamamoto et al. | 360/132 |
| 5,088,656 | 2/1992 | Yamamoto et al. | 242/199 |
| 5,249,759 | 10/1993 | Okamura et al. | 360/132 X |

FOREIGN PATENT DOCUMENTS

| 48-3019 | 1/1973 | Japan . |
| 53-87625 | 7/1978 | Japan . |
| 54-98604 | 8/1979 | Japan . |
| 57-102085 | 6/1982 | Japan . |
| 79213008 | 4/1991 | Taiwan . |
| 1072428 | 5/1966 | United Kingdom . |
| 1418143 | 12/1975 | United Kingdom . |
| 1489692 | 10/1977 | United Kingdom . |

*Primary Examiner*—John Q. Nguyen
*Attorney, Agent, or Firm*—Oblon, Spivak, McClelland, Maier & Neustadt, P.C.

[57] ABSTRACT

A tape cassette comprising a cassette casing composed of an upper half casing and a lower half casing, a pair of hubs around which a magnetic tape is wound and which are rotatably fitted into circular peripheral walls formed in the cassette casing, and tape guide members formed in the cassette casing at positions through which the magnetic tape wound around the hubs is traveled, wherein the thickness of the flat surface walls and the thickness of the outer peripheral walls of the upper and lower half casings are respectively uniform.

6 Claims, 13 Drawing Sheets

TAPE CASSETTE HAVING RIBS AND WINDOW

This application is a continuation of application Ser. No. 07/987,599, filed on Dec. 9, 1992, now abandoned.

BACKGROUND OF THE INVENTION

The present invention relates to a tape cassette such as a magnetic tape cassette, a cleaning tape cassette or a video tape cassette.

In a conventional tape cassette, a magnetic tape is guided in a tape traveling path between the head house and the hubs in the cassette casing so that the magnetic tape is wound around or rewound from the hubs. The hubs are supported for rotation by circular peripheral wall portions for fitting the hubs, which are formed around axial holes formed in the casing in order to receive the shaft portions of the hub. Various auxiliary elements are installed in the head house, and therefore, reinforcing ribs or partition walls are formed in the head house, or the wall thickness of the casing is increased, or material having service durability is used for the casing so that it has a sufficient strength and durability.

In the conventional tape cassette, the thickness of the outer peripheral wall of the casing is made thicker than the thickness of the flat surface wall portion of the casing in order to increase the impact resistance. However, the conventional tape cassette has disadvantages as follows. There is a large scatter (variation) in the wall thickness at many portions; molding properties are not good and there are strains and deformation in the molded casing. Further, since the head house area at the front portion of the casing has many ribs and partition walls, there is concentration of resin when the resin is injected to form the casing, and they are often caused recesses in the molded product. When there is a change in the wall thickness of the casing, a stream of molten resin is changed whereby strains remain at the portion of the resin stream change and a thermal deformation is apt to occur. In particular, when a casing having a thin wall thickness is required, such undesirable tendency is increased, and there are conspicuous recesses on the surface of the casing whereby the appearance of the casing is poor.

SUMMARY OF THE INVENTION

It is an object of the present invention to provide a tape cassette providing good molding properties and minimizing a strain or deformation.

It is an object of the present invention to provide a tape cassette which improves reliability on traveling of a tape and easy assembling by providing suitable tape guide members; minimizes occurrences of recesses even when the wall thickness of the casing is small while the strength of the casing can be increased, and easy processing and accurate dimensions can be obtained, and which can be used commonly for a fixed guide pole type and a guide roller type.

It is an object of the present invention to provide a tape cassette having a good appearance, a light weight and manufactured at a low cost, which minimizes a scatter in a torque for the hubs and reduces remarkably the torque by reducing the contacting area of the hubs to the casing by suitably arranging the hubs; which improves reliability on magnetic tape traveling and easy assembling, and which minimizes occurrences of recesses while increasing the strength even when the wall thickness of the cassette casing is small.

It is an object of the present invention to provide a tape cassette having a good appearance and providing good processability, which improves reliability on magnetic tape traveling and easy assembling by providing a suitable connecting construction for the upper and lower half casings, and which determines accurate position for tape cassette elements and increases the strength of the connection of the upper and lower half casings even when the wall thickness of the tape cassette is small.

According to the first invention, there is provided a tape cassette comprising a cassette casing composed of an upper half casing and a lower half casing, a pair of hubs around which a tape is wound and which are rotatably fitted into circular peripheral wall portions formed in the cassette casing, and tape guide members formed in the cassette casing at positions through which the tape wound around the hubs is traveled, said tape cassette being characterized in that the thickness of the flat surface wall portion and the thickness of the outer peripheral wall portion of the upper and lower half casings are respectively uniform.

According to the second invention, there is provided a tape cassette comprising a cassette casing composed of an upper half casing and a lower half casing, a pair of hubs around which a tape is wound and which are rotatably held in the cassette casing, and tape guide members formed in the cassette casing at positions through which the tape wound around the hubs is traveled, the tape cassette being characterized in that the tape guide members are tape guide poles having a substantially U-shape in cross section which are formed integrally with either of the upper and lower casings wherein the circular arc surface of the U-shaped tape guide poles is a tape contacting surface.

According to the third invention, there is provided a tape cassette comprising a cassette casing composed of an upper half casing and a lower half casing, a pair of hubs around which a tape is wound and which are rotatably fitted into circular peripheral wall portions formed in cassette casing, and tape guide members formed in the cassette casing at positions through which the tape wound around the hubs is traveled, said tape cassette being characterized in that the circular peripheral wall portions for fitting the hubs are projected around axial holes of the hubs, and a plurality of parallel linear ribs are formed in the vicinity of the circular peripheral wall portions for fitting the hubs in a surface area including the outer peripheral wall portions in the upper and lower half casings.

According to the fourth invention, there is provided a tape cassette comprising a cassette casing composed of an upper half casing and a lower half casing, a pair of hubs around which a tape is wound and which are rotatably held in the cassette casing, tape guide members formed in the cassette casing at positions through which the tape wound around the hubs is traveled, and connecting cylindrical bodies, said tape cassette being characterized in that a rib for melt-bonding is formed in the abutting surface of each of the connecting cylindrical bodies of either the upper half casing or the lower half, and a position-determining boss is formed in the abutting surface of each of the connecting cylindrical bodies of the other.

DETAILED DESCRIPTION OF THE PREFERRED EMBODIMENTS

Figure 1:
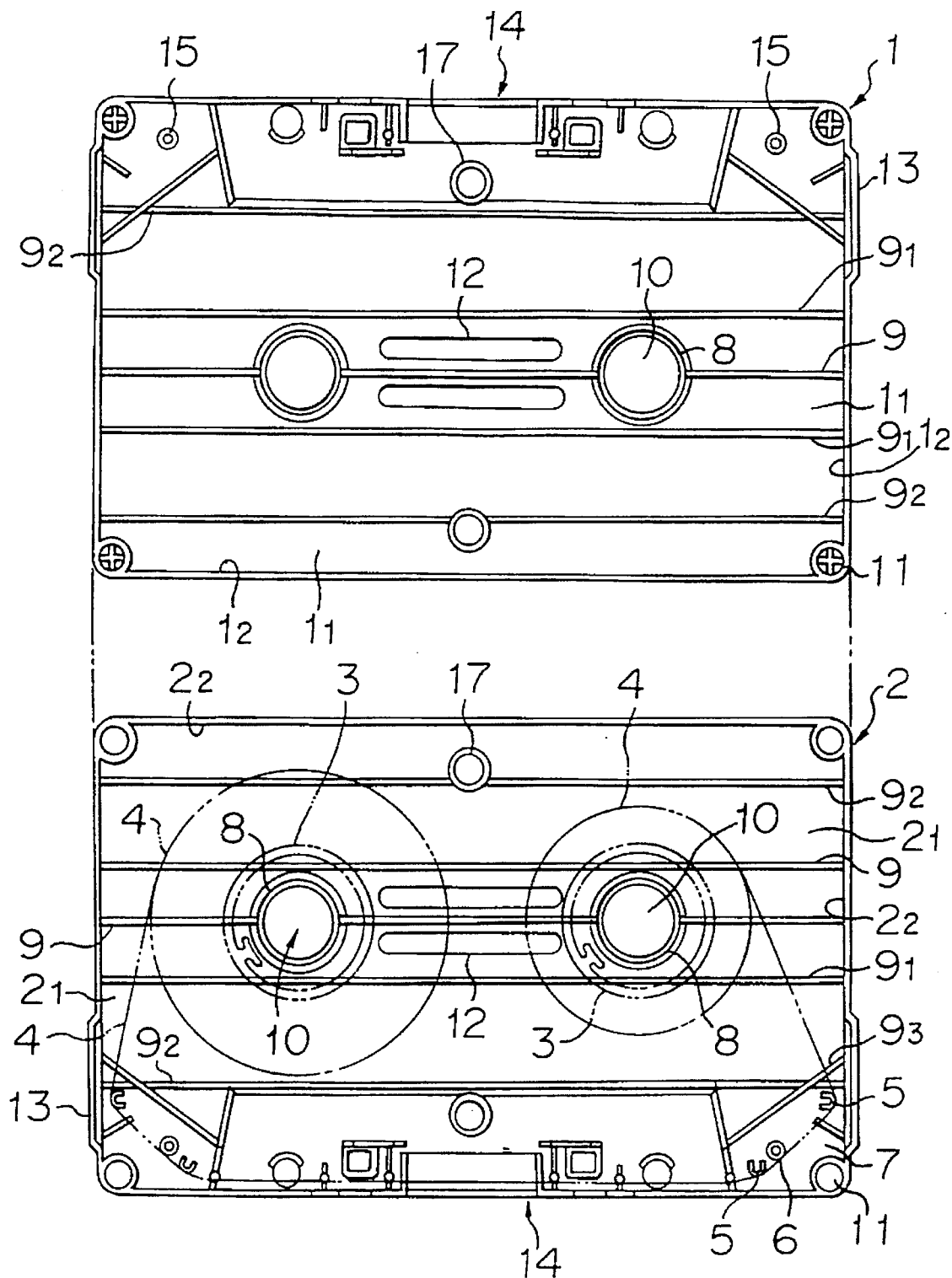
FIG. 1 is a plan view showing an embodiment of the tape cassette of the present invention wherein the upper and lower half casings are shown in a separated state to show the inside of them.
Figure 2:
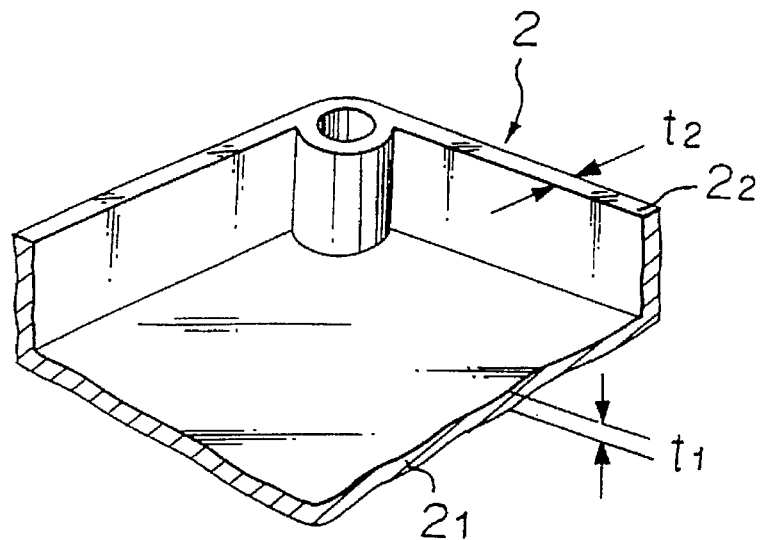
FIG. 2 is an enlarged perspective view partly omitted of the lower half casing shown in FIG. 1.
Figure 3:
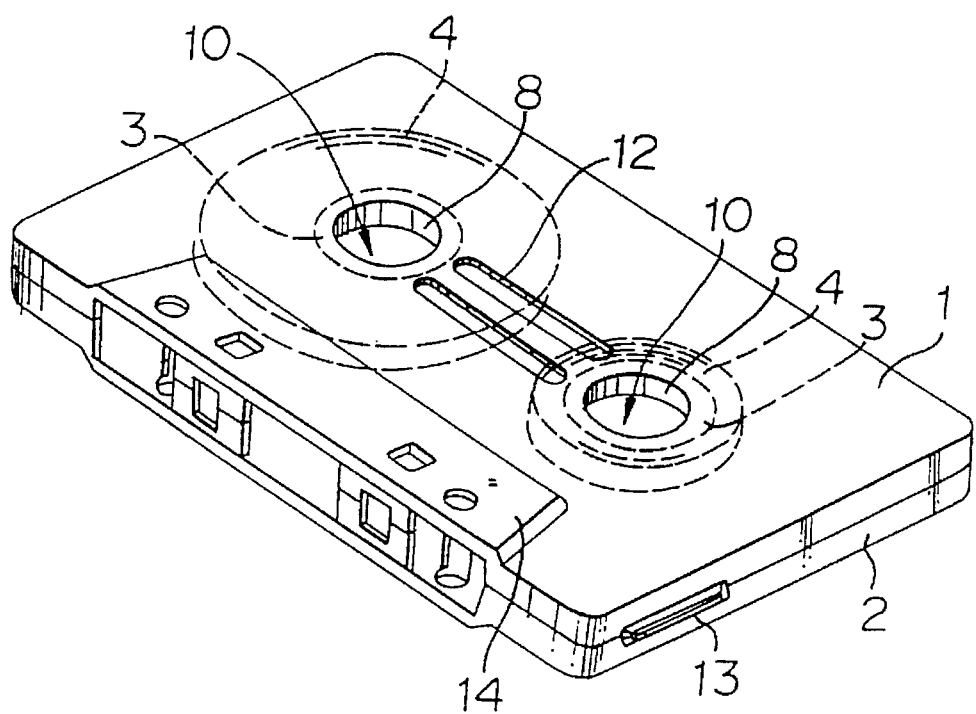
FIG. 3 is a perspective view in a state of use of the embodiment shown in FIG. 1.

Preferred embodiments of the tape cassette according to the present invention will be described with reference to the drawings.

FIG. 1 through 4 shows a first embodiment of the tape cassette of the present invention. A cassette casing comprises an upper half casing 1 and a lower half casing 2. Inside the cassette casing, a pair of hubs 3 around which a tape 4 such as a magnetic tape is wound are rotatably supported by circular peripheral wall portions 8 for fitting the hubs 3, which are formed integrally with the upper and lower half casings 1, 2. As tape guide members located in the tape traveling path between the hubs 3, 3, provided are tape guide poles 5 having a substantially U-shape in cross section. The tape guide poles 5 are formed integrally with the upper half casing 1 or the lower half casing 2 so that the circular arc surface of the substantially U-shape comes in contact with the tape traveling. The circular peripheral wall portions 8 for supporting the hubs 3 are projected from the inner surface of the upper and lower half casings 1, 2 at positions around axial holes 10 for receiving the shaft portion of the hubs. A plurality of linear ribs 9, $9_1$ are formed in a parallel relation so as to extend in an area including the circular peripheral wall portions 8, 8 and in the vicinity of them. In this embodiment, the thickness of the flat surface wall portion $1_1$, $2_1$ of the upper and lower half casings 1, 2 is determined in a range of $t_1$=0.8–1.2 mm, and the thickness of the outer peripheral wall portions $1_2$, $2_2$ is determined in a range of $t_2$=0.8–1.2 mm. The wall thickness of each of the upper and lower half casings 1, 2 and the outer peripheral walls $1_2$, $2_2$ is substantially uniform. A scatter in the wall thickness of each of the flat surface walls $1_1$, $2_1$ and the outer peripheral walls $1_2$, $2_2$ should be 20% or lower.

Reinforcing ribs formed projecting from the inner surface of the upper and lower half casings have a height sufficient to mount thereon the hubs 3, and include a center rib 9 connected to the circular peripheral walls 8 for fitting the hubs and arranged on a linear line connecting the center of each of the axial holes 10, 10 for receiving the shaft portion of the hubs, and side ribs $9_1$, $9_1$ arranged with a distance at both sides of the center rib 9. The circular peripheral walls 8 are so constructed to reduce the surface area of contact of the hubs 3 to the cassette casing to thereby reduce a torque.

In addition to the reinforcing ribs 9, $9_1$, the provision of reinforcing ribs $9_2$ at positions near a head house 14 and the opposite side of it are effective to reduce the wall thickness of the cassette casing. When the width of each of the ribs 9, $9_1$, $9_2$ is made thinner than the wall thickness of the upper and lower half casings, a preferred stream of resin is obtained at the time of molding, and accordingly, a tape cassette having less residual strain, accurate dimensions and excellent heat resistance can be obtained. It is preferable to locate the tape guide members b near each support pin 6 for supporting a roller for guiding the tape, which is formed in either the upper or the lower half casing. Preferably, some of the tape guide members 5 are provided to be removable. It is further preferable that the tape guide members 5 are located at both corner portions 7, 7 in either half casings so that a plurality of the tape guide members 5 are used and they are disposed at both sides of a plurality of supporting pins 6.

It is preferable that the wall thickness of the upper and lower half casings is thin as possible while a sufficient strength should be maintained. For this purpose, partition walls $9_3$ are preferably formed together with connecting bosses 11, 17 in addition to the reinforcing ribs 9, $9_1$, $9_2$ formed around the circular peripheral walls 8, 8 for fitting the hubs 3, at each of the corner portions 7.

Each of the upper and lower half casings 1, 2 is provided with windows 12, 12 between the circular peripheral walls 8, 8 for fitting the hubs and between the linear ribs 9, $9_1$ and along these ribs, whereby an amount of the tape around the hubs is visible. In this case, the cassette casing body may not be transparent and a transparent window may not be provided. Further, a tape cassette having a unique design is provided.

Finger touch portions 13 are provided at both side surfaces of the upper and lower half casings 1, 2 at positions near the head house 14.

The head house 14 is a section for recording and reproducing a tape and comprises an insertion hole, supporting walls and an opening. In FIG. 1, reference numerals 15 designate pin bearing portions.

In the above-mentioned first embodiment of the tape cassette having the construction described above, the thickness of the flat surface wall portions and the outer peripheral wall portions of the upper and lower half casings are respectively formed to be substantially uniform, whereby a scatter in the wall thickness of each of the wall portions can be small, molding property is remarkably improved to reduce occurrence of strains or deformation, accuracy in dimensions, and reliability on heat resistance can be increased. Further, a tape cassette having thin upper and lower half casings, a low manufacturing cost and suitable for a large-scale production can be provided.

Figure 4:
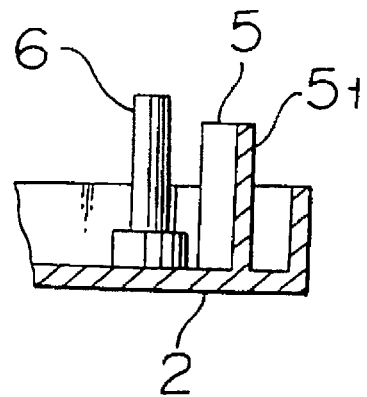
FIG. 4 is an enlarged longitudinal cross-sectional view of a corner portion of the lower half casing shown in FIG. 1.
Figure 5:
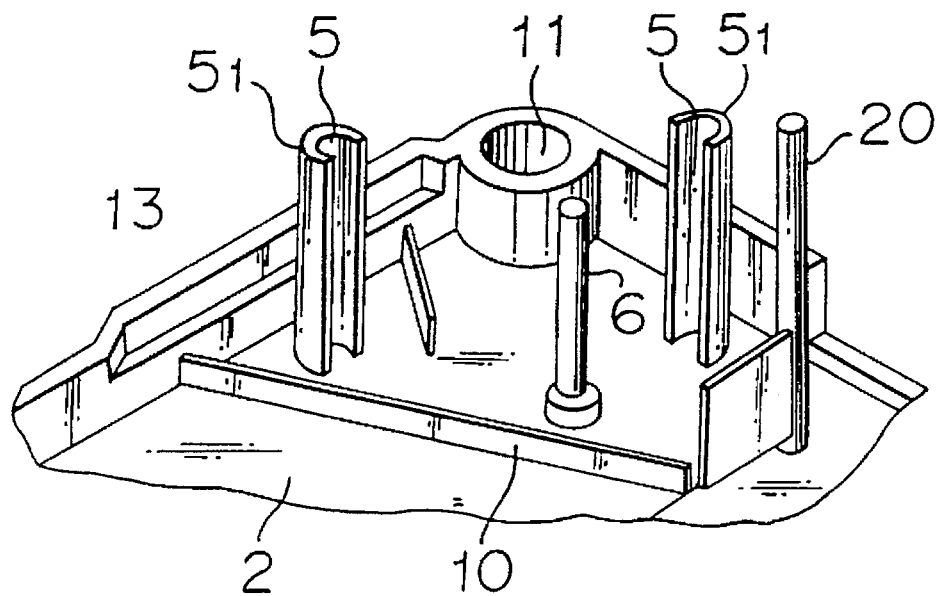
FIG. 5 is an enlarged perspective view of an embodiment of a corner portion of the lower casing according to the present invention.

FIGS. 4 and 5 show in detail a positional relation of the tape guide poles 5 to the guide roller supporting pin 6 provided in, for instance, the lower half casing 2.

Figure 6:
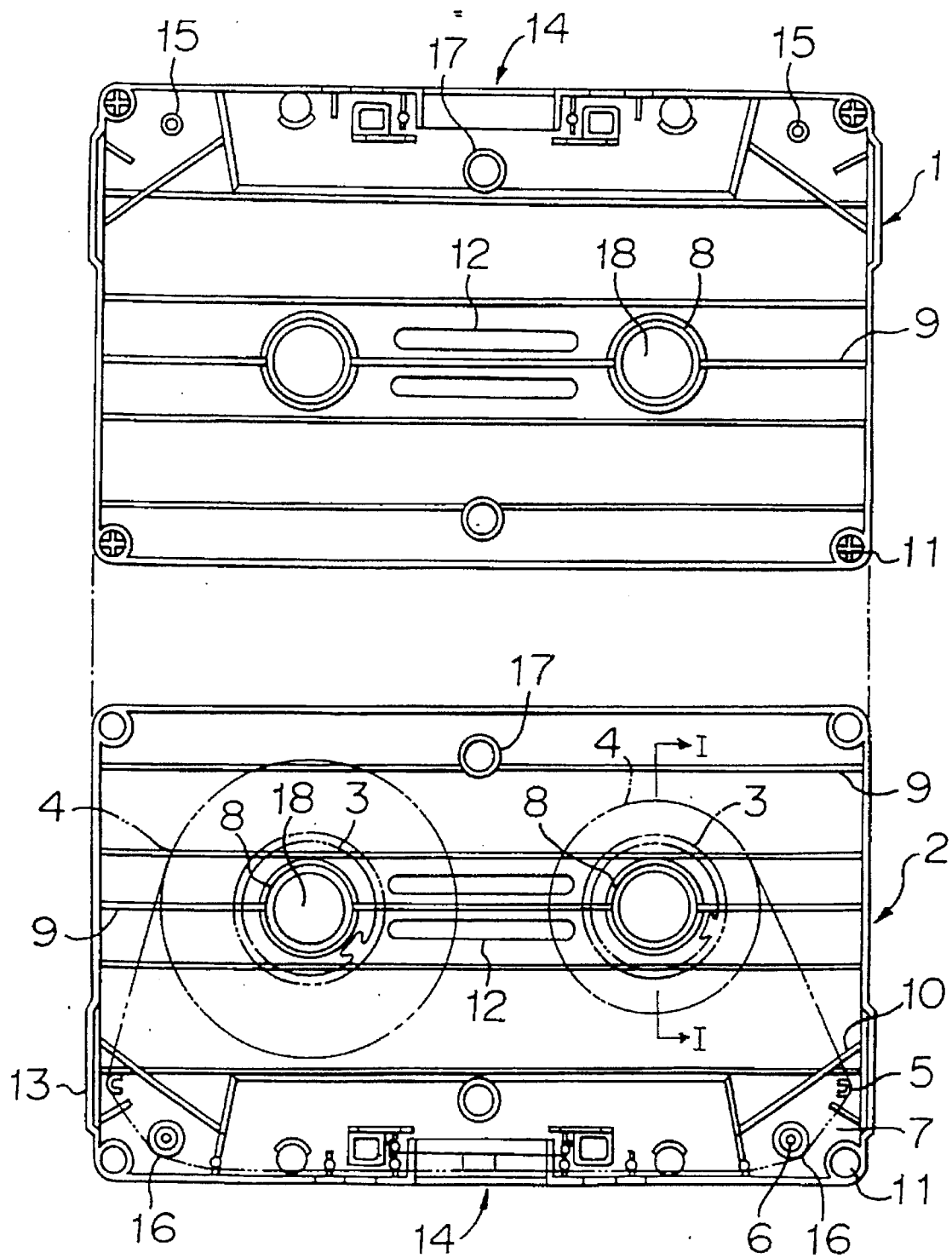
FIG. 6 is a plan view of another embodiment of the present invention wherein the upper and lower half casings are shown in a separate state to show the inside of them.
Figure 7:
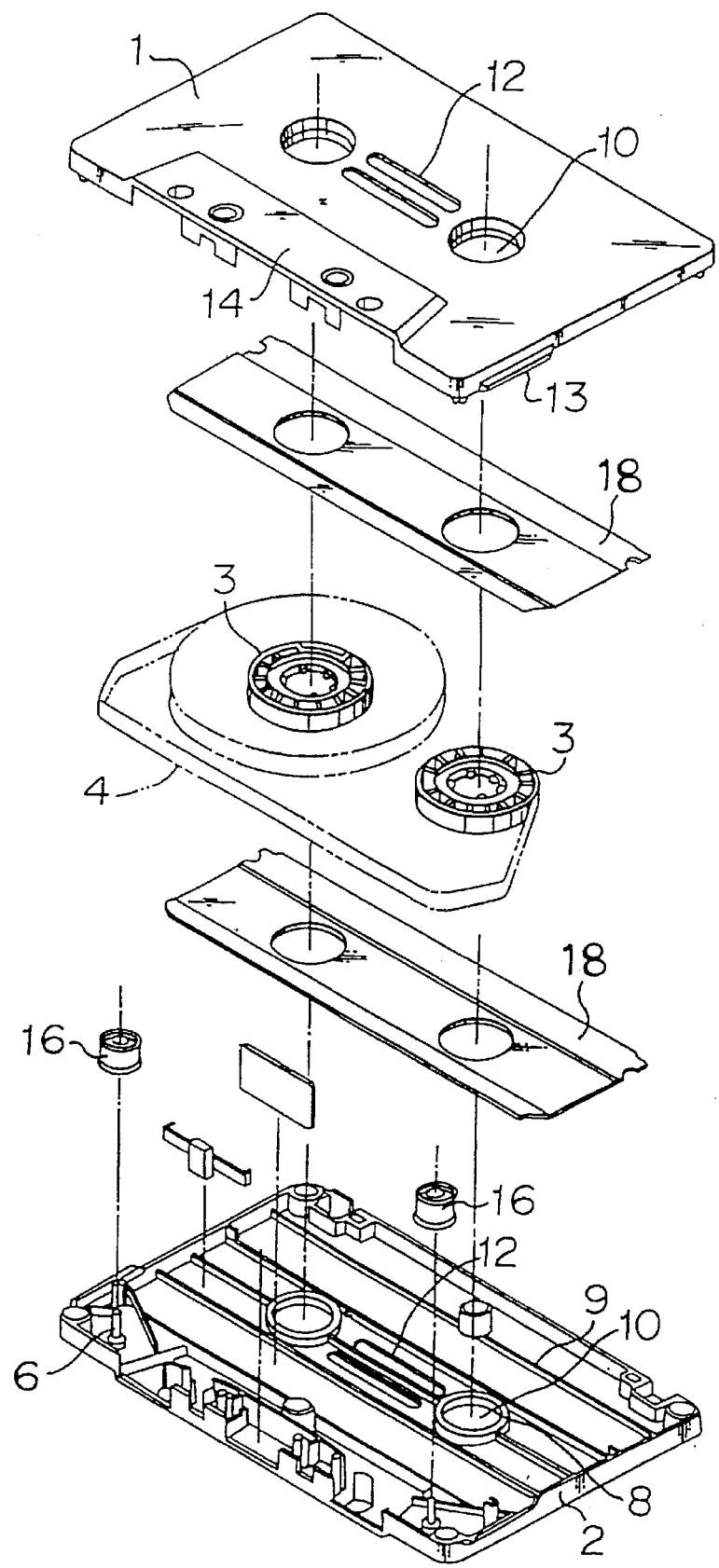
FIG. 7 is a perspective view in an exploded state of the tape cassette shown in FIG. 6.

FIGS. 6 and 7 shows another embodiment of the tape cassette according to the present invention, in which tape guide rollers 16 are assembled to form a tape cassette.

In this embodiment, the tape guide poles 5 which has been located near and both sides of the head house 14 are removable, and the tape guide rollers 16 are respectively put around the roller supporting pins 6 to thereby form a traveling path for the tape 3.

In the embodiment shown in FIGS. 6 and 7, the tape guide poles having a U-shape in cross section whose circular arc surface provides a tape contacting surface are formed integrally with the upper and lower half casings in the same manner as the first embodiment shown in FIGS. 1 through 5. Accordingly, precise location of the tape guide poles is obtainable to thereby improve reliability on the tape traveling and easy assembling for the tape cassette. Further, the tape cassette of the embodiment shown in FIGS. 6 and 7 can be used commonly for a fixed guide pole type and a guide roller type. The other advantages of the embodiment are the same as those of the first embodiment.

Figure 8:
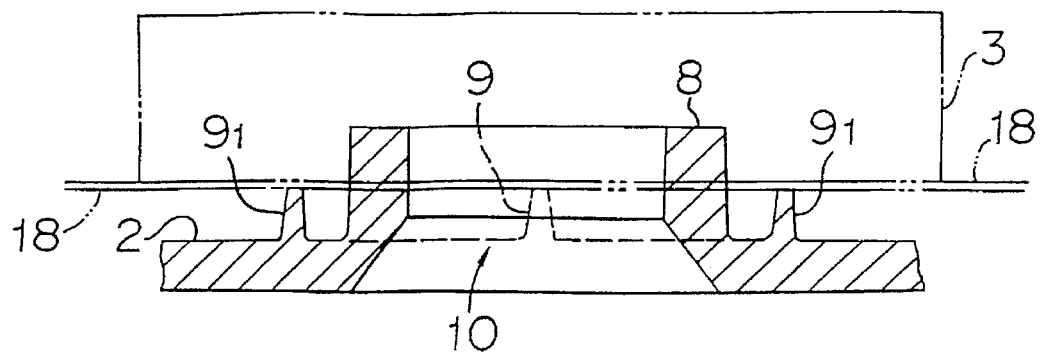
FIG. 8 is an enlarged cross-sectional view taken along a line I—I in FIG. 6.
Figure 9:
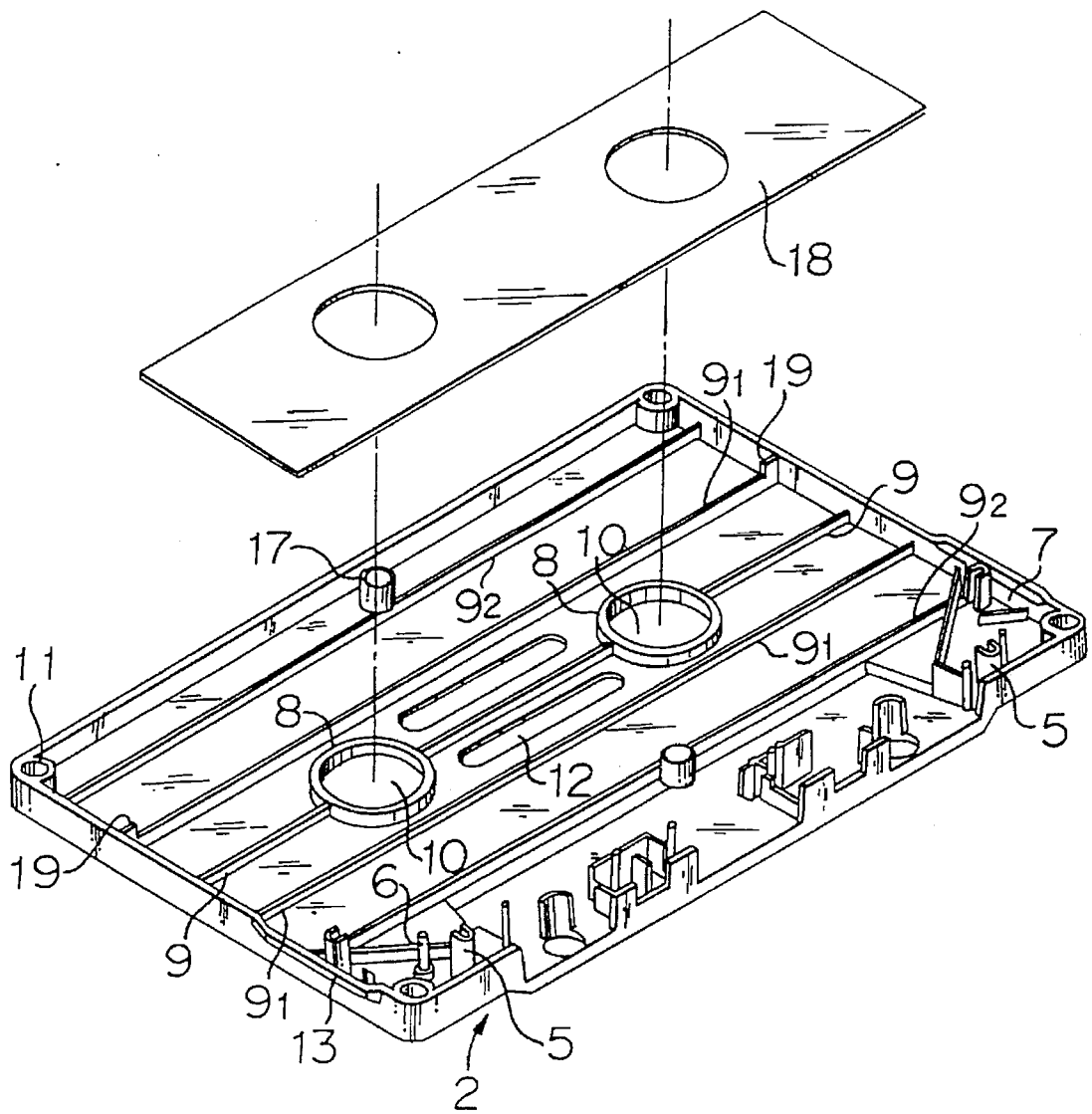
FIG. 9 is an enlarged perspective view of an embodiment of the lower half casing of the present invention.

FIGS. 8 and 9 show in details a relation of linear ribs to circular peripheral wall portions for fitting the hubs in the lower half casing 2.

The same reference numerals as in FIGS. 1 through 7 designate the same or corresponding parts.

The linear ribs comprise the center rib 9 which has a thickness thinner than the wall thickness of the lower half casing (or the upper half casing), a height sufficient to mount thereon the hubs 3 and arranged in a linear line to connect the center of the axial holes 10 for receiving the hubs and contiguous to the circular peripheral walls 8 for fitting the hubs, and the side ribs $9_1$, $9_1$ arranged at both sides of the center rib 9 with a certain distance. The center rib 9 and the side ribs $9_1$, $9_1$ are formed integrally with the inner surface of the lower half casing 2. It is desirable to form reinforcing ribs $9_2$ at both sides and near the head house 14 of the lower half casing 2.

Since the thickness of the linear rib and reinforcing ribs are made thinner than the wall thickness of the lower half casing 2 (or the upper half casing), a smooth flow of resin at the time of molding the casing is obtained and the casing having a less residual strain and accurate dimensions and good thermal resistance is obtainable.

Shoulder portions 19 are provided at both end portions of at least one of the linear ribs 9, $9_1$ to support a tape movement controlling sheet 18 in the casing, whereby excellent assembling property is obtainable.

In the embodiment shown in FIGS. 8 and 9 wherein circular peripheral wall portions for fitting the hubs are formed around axial holes for receiving the shaft portion of the hubs, and linear ribs are formed in parallel with each other in the casing in an area including the circular peripheral wall portions and in the vicinity of them, the hubs around which a tape is wound can be correctly positioned in the cassette casing, and a contacting surface area of the casing to the hubs is made small to thereby reduce a resistance of friction and to reduce a torque of hub, whereby reliability on traveling of the tape, stabilization of torque and easy assembling of the cassette casing can be remarkably improved. Further, a tape cassette which eliminates occurrence of recesses and increases the strength even though the wall thickness of the cassette casing is thin can be provided. Further, such tape cassette having good appearance, light weight, a low manufacturing cost and suitable for a large scale production can be provided.

Figure 10:
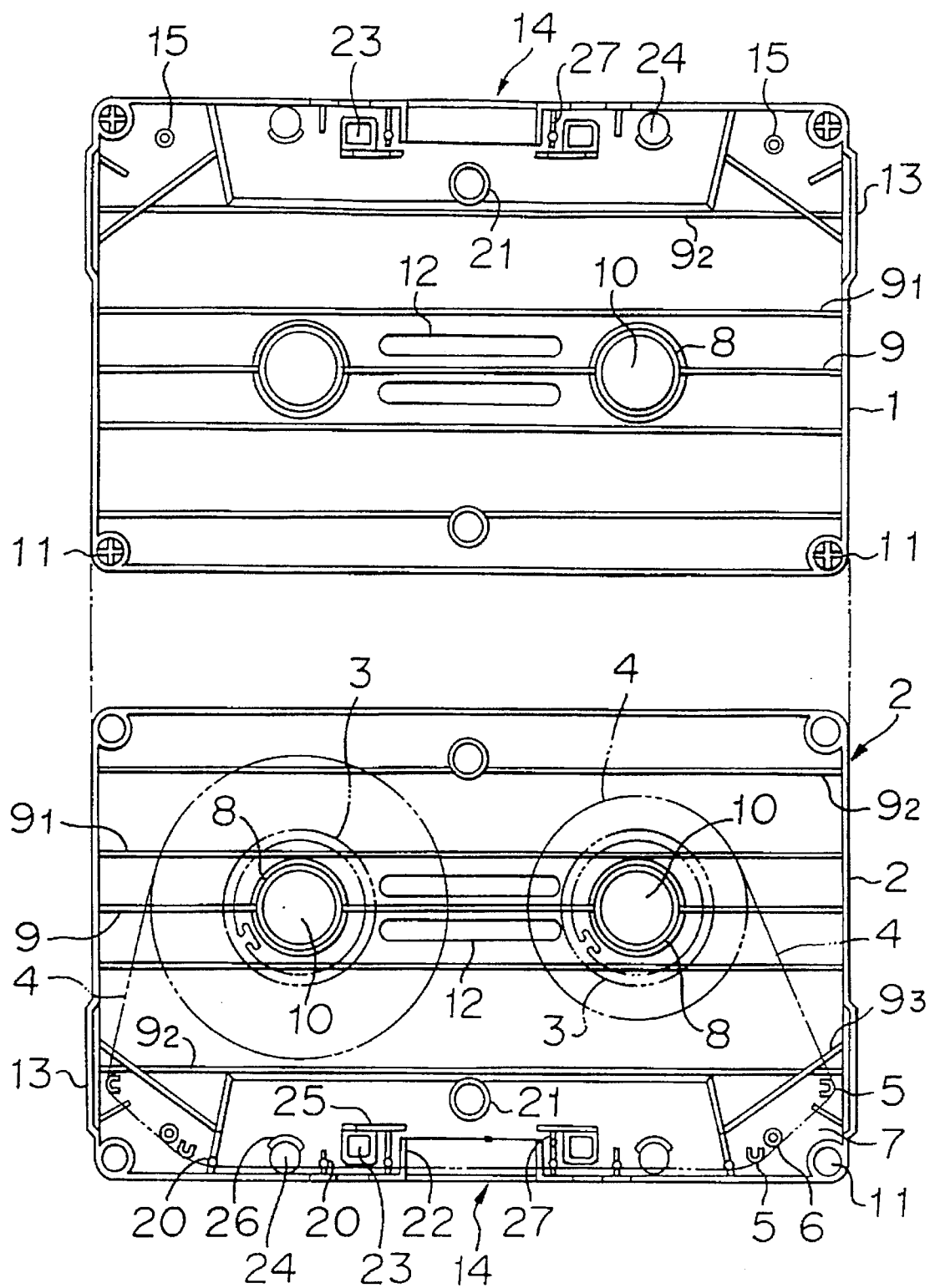
FIG. 10 is a plan view showing another embodiment of the tape cassette of the present invention wherein the upper and lower half casings are shown in a separate state to show the inside of them.

FIG. 10 is a plan view showing a modification of the head house 14 shown in FIG. 1.

The head house 14 of each of the upper and lower half casings 1, 2, is constituted solely by tape guide pins 20, a center boss 21, shield plate surrounding walls 27 and pad supporting plates 22 which form a head insertion recess in which a shield plate and a pad are received, and partition walls 25, 26 for surrounding in part cassette position determining openings 23 and capstan insertion holes 24 respectively. The partition wall 25 comprises an I-shaped rib having a cutout in the longitudinal direction of the head house.

The circular peripheral walls 8 for fitting the hubs are formed around the axial holes 10 for receiving the hubs. A plurality of thin linear ribs 9, $9_1$ are formed in a parallel relation in an area including the circular peripheral walls 8, 8 and near them.

The head house 14 has a shouldered recess portion formed in the casing. A magnetism shielding wall $9_2$ is formed along the inner edge of the shouldered recess portion to thereby define that portion from an area where the circular peripheral walls 8 for fitting the hubs are formed.

The thin linear ribs comprise a center rib 9 which has a thickness thinner than the wall thickness of the upper and lower half casings and a height suitable for mounting thereon the hubs 3 and which is arranged on the linear line connecting each center of the axial holes 10, 10 for receiving the hubs so as to be connected to the circular peripheral walls 8, and side ribs $9_1$, $9_1$ formed at both sides of the center rib 9 with a certain distance. The center rib 9 and the side ribs 9 are formed integrally with the inner surface of the upper and lower half casings.

Reinforcing ribs may be formed at positions near the head house 14 and the opposite side in consideration of a balance in wall thickness. In the embodiment shown in FIG. 10 which has the construction as described above, a smooth flow of molten resin can be obtained in molding operations to thereby avoid occurrence of recesses or strains as well as providing good releasability. Further, the preparation of accurate metal modls for molding the upper and lower half casings are easy because pins are independently provided and the partition walls are separately prepared. In the tape cassette of the embodiment, occurrence of recesses can be prevented even though the wall thickness of the cassette casing is thin and it has excellent appearance. Further, it can be manufactured at a low cost and is suitable for a large scale production.

Figure 11:
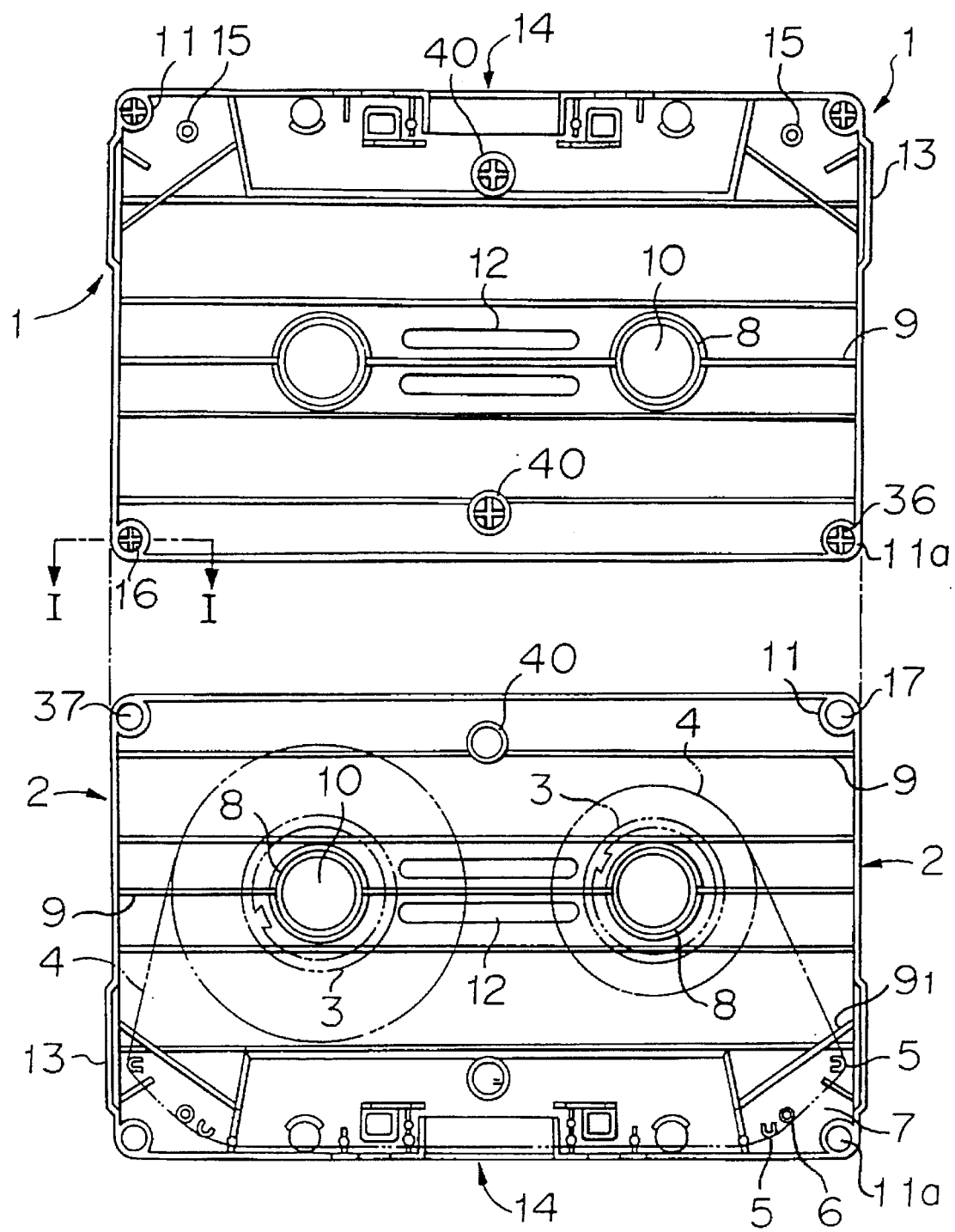
FIG. 11 is a plan view showing another embodiment of the tape cassette of the present invention wherein the upper and lower half casings are shown in a separated state to show the inside of them.
Figure 12:
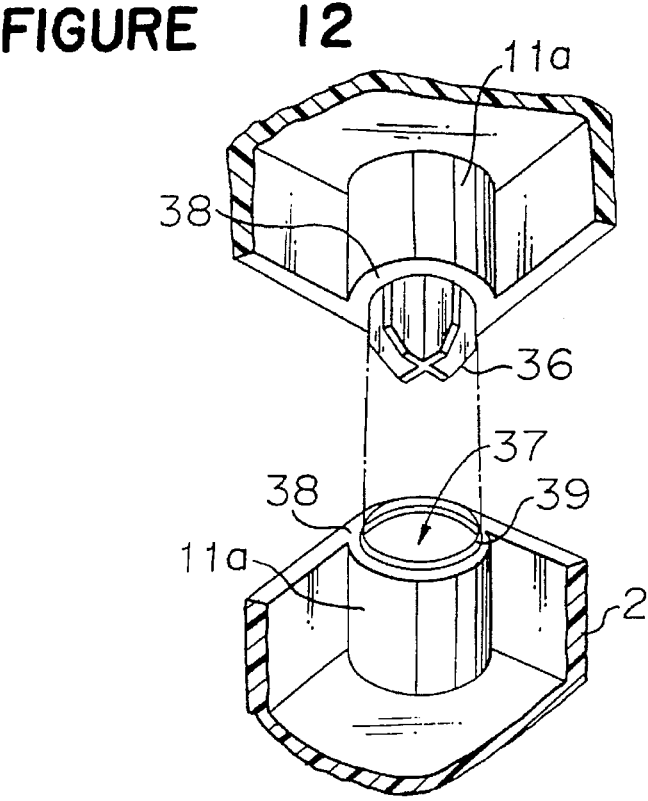
FIG. 12 is an enlarged longitudinal cross-sectional view taken along a line I—I in FIG. 11.
Figure 13:
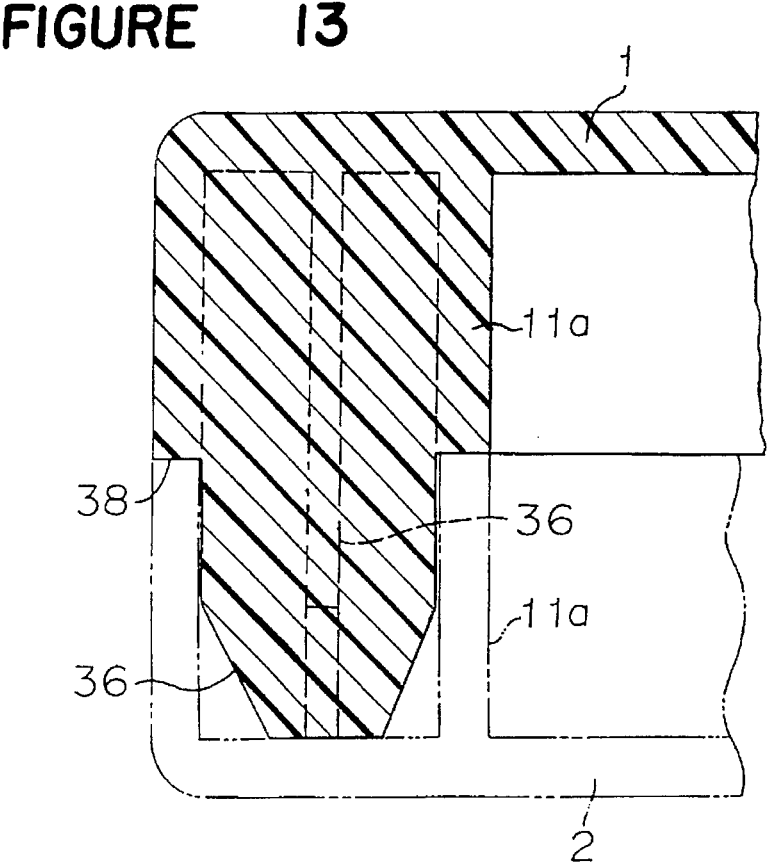
FIG. 13 is an enlarged longitudinal cross-sectional view partly omitted of a corner portion of the upper and lower half casings shown in FIG. 11.

FIGS. 11 through 13 show another embodiment of the present invention.

The upper and lower half casings 1, 2 constitute a cassette casing in which a pair of the hubs 3 around which a tape 4 is wound are rotatably supported by the circular peripheral walls 8 for fitting the hubs. Tape guide poles 5 having a substantially U-shape in cross section are located in a tape traveling path between the hubs 3, 3. The tape guide poles are formed integrally with either the upper half casing 1 ro the lower half casing, 2 so that the circular arc surface functions as a tape contacting surface. Connecting cylindrical bodies 11a are formed at four corners of the upper and lower half casings 1, 2. The connecting cylindrical bodies 11a respectively have an abutting surface 38 at their top. A rib for melt-bonding 39 is formed at the abutting surface of each of the connecting cylindrical bodies 11a of either of the upper and lower half casings 1, 2 and a position-determining boss 36 is formed at the abutting surface 38 of each of the connecting cylindrical bodies of the other.

The connecting cylindrical bodies 11a are respectively cylindrical bodies each having a cylindrical hole 37 at their axial center. The position-determining boss 36 is projected from the abutting surface 38 as a melt-bonding surface so that the boss is fitted to the hole 37 of the opposing connecting cylindrical body 11a. The hole 37 formed in the connecting cylindrical body 11a may not be a circular shape but it may be a polygonal shape such as a regular triangle shape, a square shape, a regular hexagonal shape or a regular octagonal shape as far as it can easily receive the position-determining boss 36 projecting from the opposing connecting cylindrical body. The position-determining boss 36 may be a shape of cross or star having radially extended blade portions wherein the top edge of the boss is slender. The root portion of the position-determining boss is press-fitted to the inner circumferential wall of the connecting cylindrical body 11a, or the boss may be formed integrally with the connecting cylindrical body 11a. Tape guides 5 are located near tape guide roller supporting pins 6 formed in the lower half casing 2. The tape guides 5 are preferably formed to be removable by breaking. It is more preferable that the tape guide poles 5 are in corner portions 7, 7 so that they are located with a distance between which a plurality of the tape guide roller supporting pins 6 are arranged.

The wall thickness of the upper and lower half casings should be thin. For instance, the wall thickness of the flat surface of the casings is 1.0 mm or less and the difference in wall thickness of the flat surface wall of the casings from the outer peripheral wall of the casings is within 0.2 mm. In order to maintain the strength of the casings, circular peripheral walls 8, 8 for fitting the hubs 3 are formed and a plurality of reinforcing ribs are provided near the circular peripheral walls 8, 8. Further, partition walls may be formed at each of the corner portions 7. The thickness of the reinforcing ribs 9 are thinner than the wall thickness of the casings so that a smooth flow of resin at the molding can be obtained. As a result, a tape cassette having a less residual strain, accurate dimensions and thermal resistance is obtainable.

The tape cassette shown in FIG. 11 can be applied not only to a tape cassette but also a disk cartridge.

A center boss 40 may be formed if necessary, and the position-determining boss 36 and the melt-bonding rib 39 may be provided for other bosses to further increase the connection and the strength of the casings.

In the embodiment shown in FIGS. 11 through 13, the connection of the upper and lower half casings which forms a cassette casing can be obtained with high precision without resulting an error of position in melt-bonding. Accordingly, reliability and easy assembling of the tape cassette can be remarkably improved. Further, a tape cassette having good appearance, high precision and an increased strength while the thickness of the cassette casing is thin can be provided.

FIG. 14 through 19 show another embodiment of the tape cassette having an improved connecting bosses for connecting the upper and lower half casings.

Figure 14:
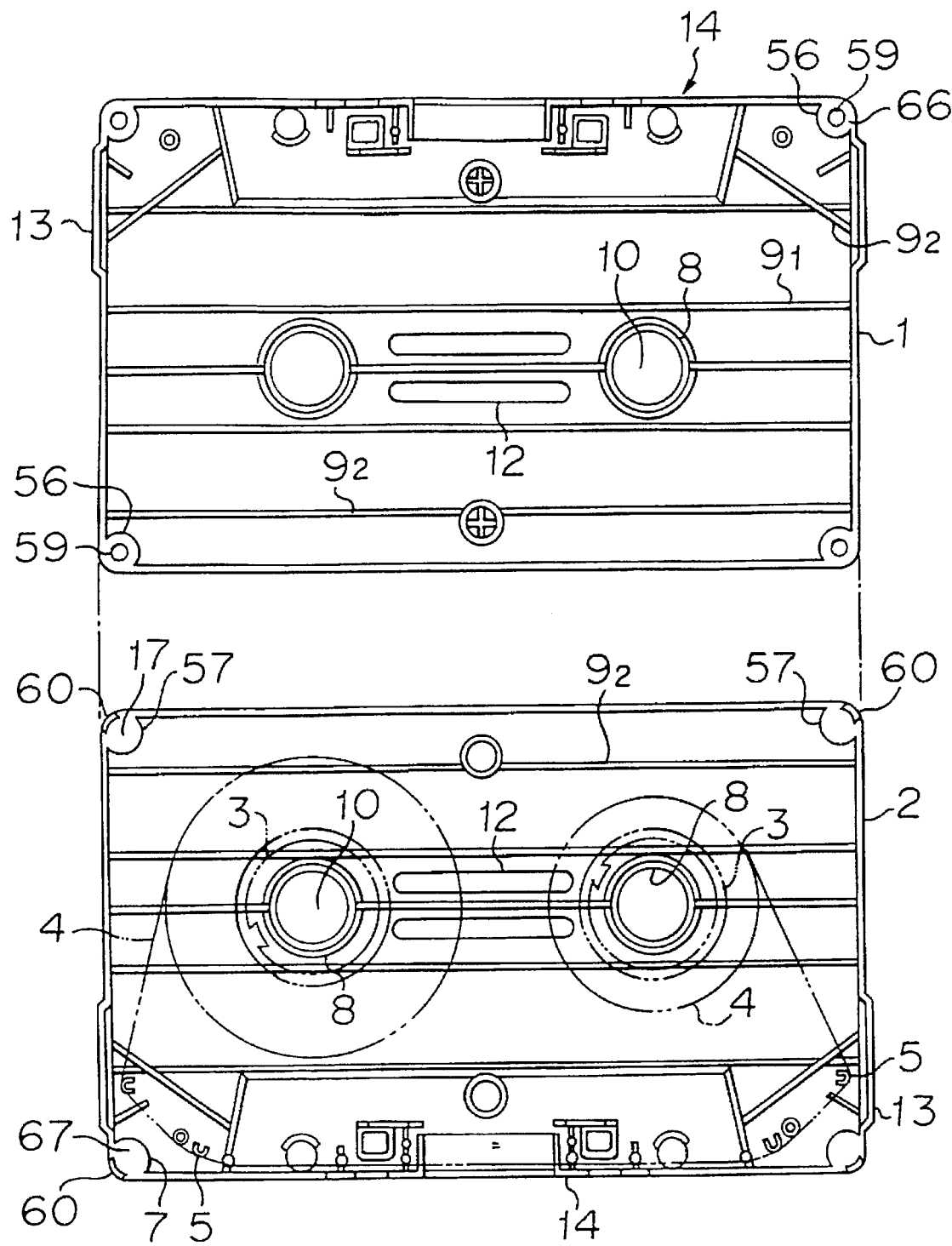
FIG. 14 is a plan view showing another embodiment of the tape cassette of the present invention wherein the upper and lower half casings are shown in a separated state to show the inside of them.

In FIG. 14, the upper and lower half casings 1, 2 respectively have bosses 56, 57 to be used for assembling the upper and lower half casings by using ultrasonic waves. A melt-bonding rib 59 is formed in the contacting surface 66 of each of the melt-bonding bosses 56. On the other hand, a cut portion 60 is formed at the outer side of the contacting surface 67 of each of the melt-bonding bosses 57 which oppose the melt-bonding bosses 56. The cut portion 60 is to receive a part of molten portion of the melt-bonding rib 59.

Figure 15:
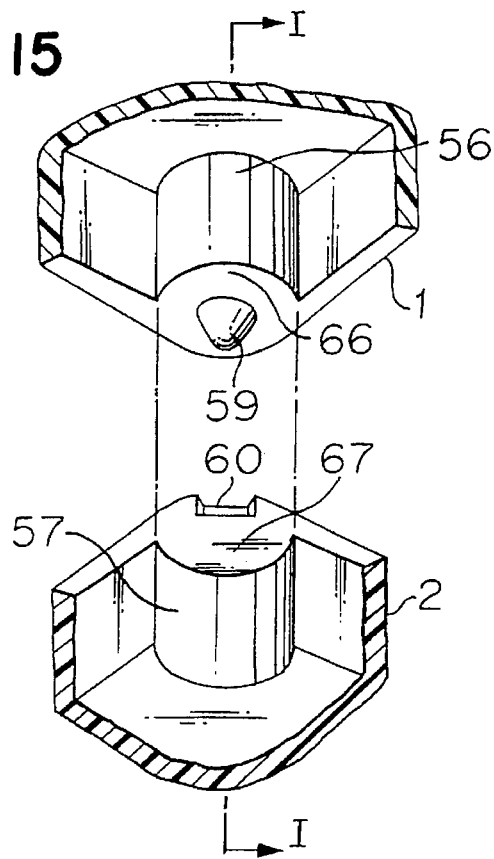
FIG. 15 is an enlarged perspective view in a separated state of a corner portion of the upper and lower half casings shown in FIG. 14.
Figure 16:
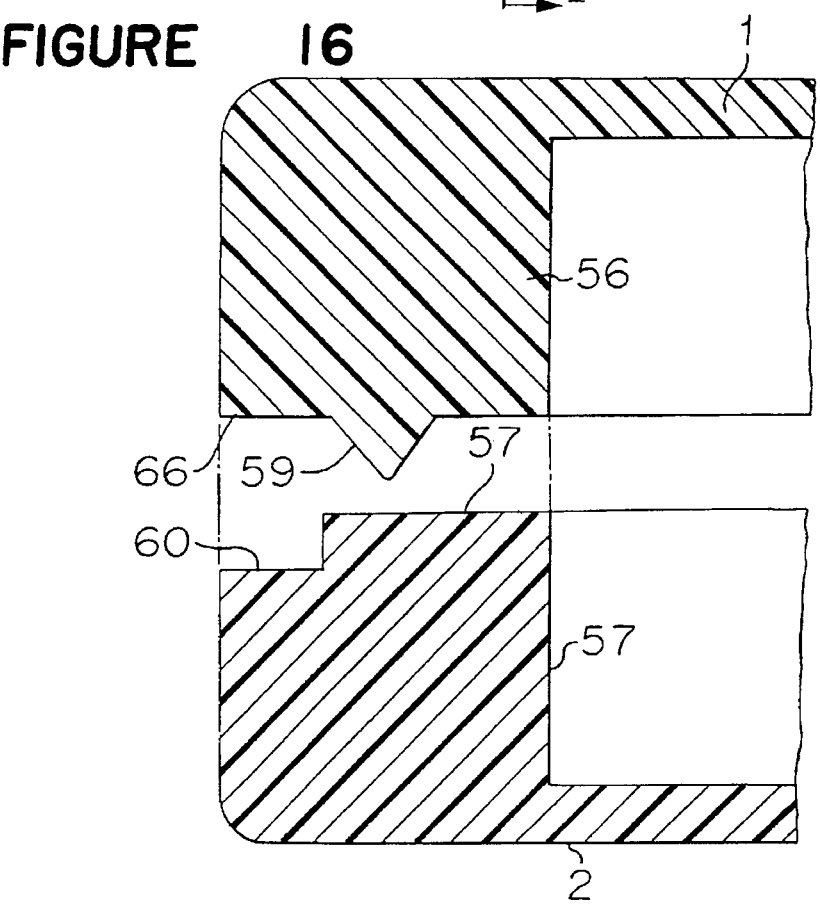
FIG. 16 is an enlarged longitudinal cross-sectional view taken along a line I—I in FIG. 15.
Figure 17:
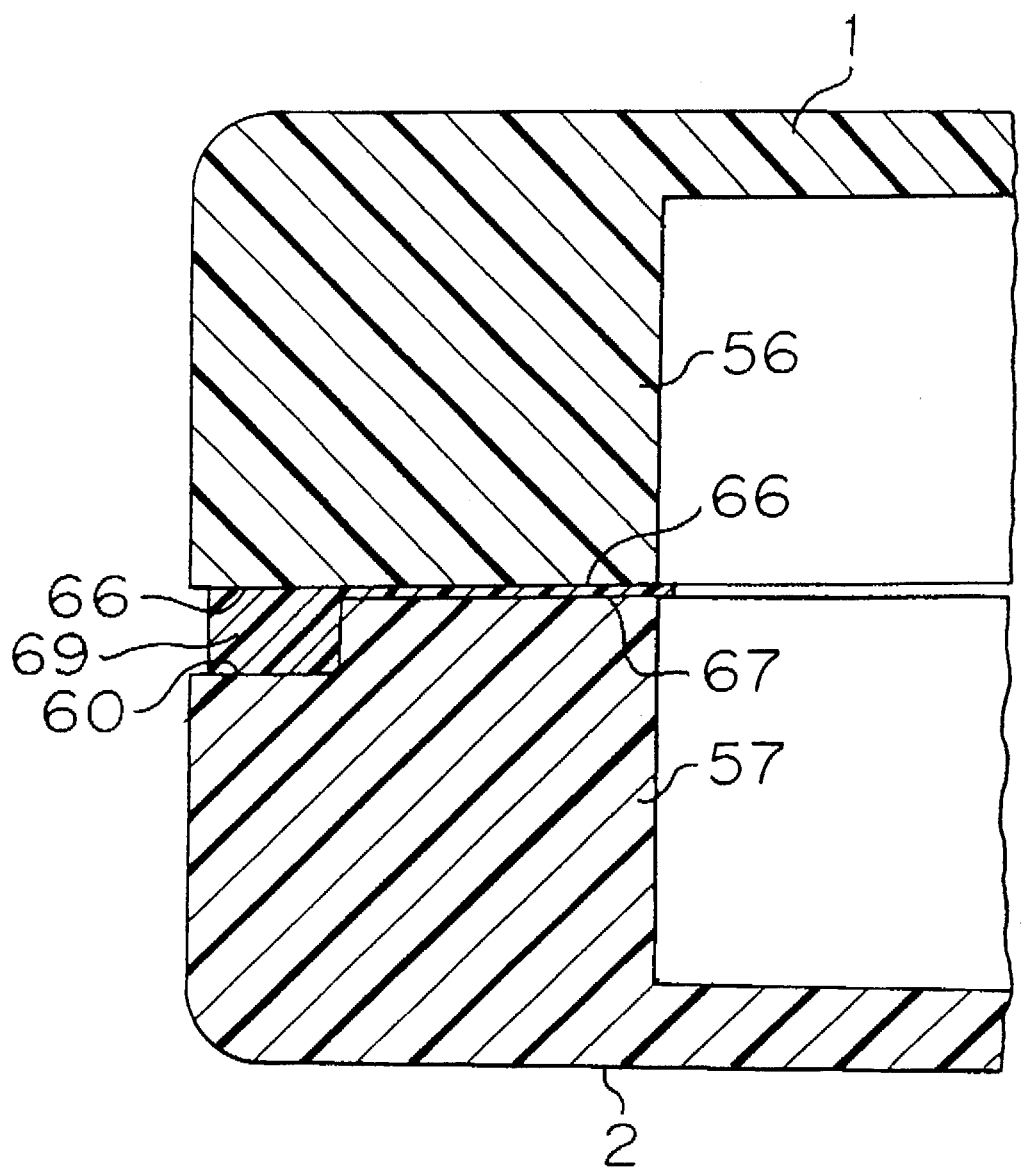
FIG. 17 is an enlarged longitudinal cross-sectional view of the upper and lower half casings in a state of connection shown in FIG. 16.

As shown clearly in FIGS. 15 through 17, the melt-bonding boss 56 is provided with a conical or an annular melt-bonding rib 59 at the central portion of the contacting surface 66. The cut portion 60 to be formed in the opposing melt-bonding boss 57 should be formed at a position which does not directly contact with the melt-bonding rib 59. However, the cut portion 60 may be formed at the both melt-bonding bosses 56, 57. The melt-bonding rib 59 may be formed at a suitable position in the contacting surface as far as a molten material is prevented from flowing outside the contacting surface 66, 67 and there is free from an error in position of the upper and lower half casings.

The cut portion 60 may be provided in a form of radially extending grooves in the contacting surface other than a shape formed by cutting away a part of the outer circumference of the melt-bonding boss as shown in FIGS. 14 through 17. Or, the cut portion 60 may be parallel linear grooves or a latice-like form within which the center rib 59 is formed at the central portion.

The melt-bonding boss may not be in a cylindrical form but also may be a polygonal boss such as a regular triangle boss, a square boss, a regular hexagonal boss, or a regular octagonal boss. The melt-bonding boss is formed integrally with the upper and lower half casings.

The embodiment shown in FIG. 14 is used for a tape cassette. However, it can be used as a disk cartridge.

A center boss may be formed if required. The melt-bonding rib and the cut portion may be formed in another boss to further increase the strength of connection and resistance to distortion.

Figure 18:
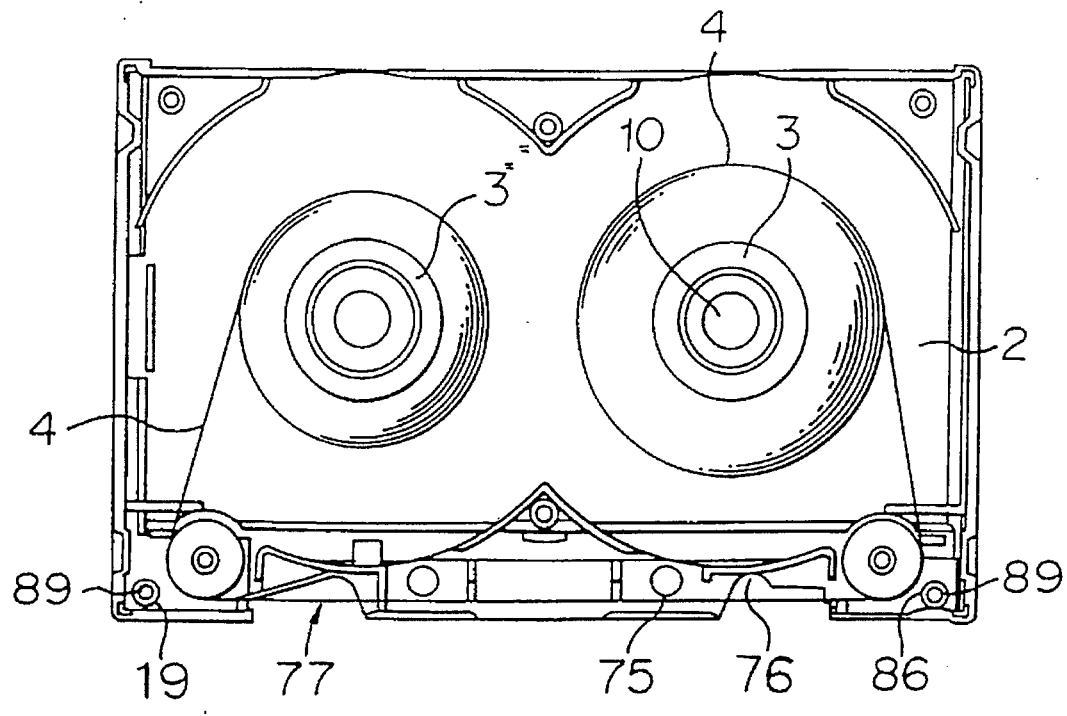
FIG. 18 is a plan view of an embodiment of the lower half casing of the present invention.
Figure 19:
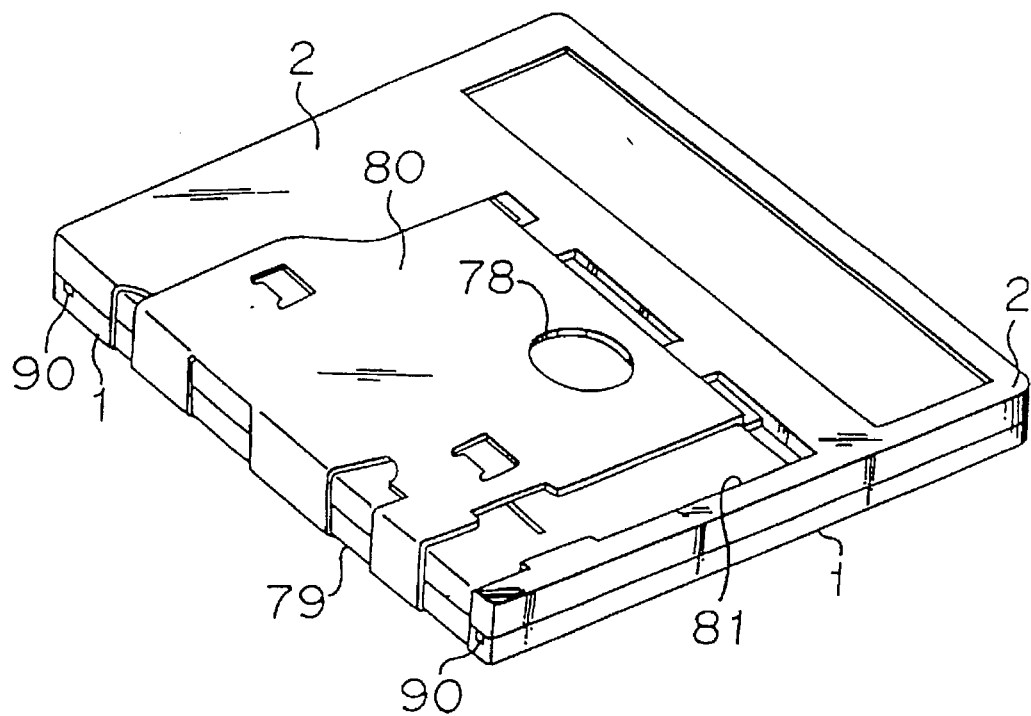
FIG. 19 is a perspective view of the lower half casing in use shown in FIG. 18.

FIGS. 18 and 19 shows a digital compact cassette (DCC) type tape cassette. In FIGS. 18 and 19, a shutter 80 having a channel form in cross section which has windows 78, 79 for opening and closing a driving shaft insertion opening 10, a case position determining opening 75, a capstan insertion opening 76 and a front opening 77, is slidably placed in a slide area 81. In the upper and lower half casings, melt-bonding bosses 86, 86 are provided in an opposing state so that the upper and lower half casings 1, 2 are assembled by ultrasonic melt-bonding. A melt-bonding rib 89 is formed in melt-bonding bosses formed either the upper half casing or the lower half casing, and a cut portion to receive molten material of the melt-bonding rib is formed in the melt-bonding bosses of the other casing. In FIGS. 14 through 19, a cut portion to receive a molten part of the melt-bonding rib is formed at an outer portion of the melt-bonding bosses of either of the casings, whereby the flooding of the molten material is prevented. Further, an error in position of the assembled casings can be eliminated. Since the molten material can be received in the cut portion, a cassette casing having good appearance is obtainable. Further, a large strength of connection between the opposing melt-bonding bosses is obtained, whereby the upper and lower half casings forming a cassette casing can be strongly and precisely connected.

We claim:

1. A tape cassette comprising:

a cassette casing composed of an upper half casing and a lower half casing, each formed of a flat surface wall portion and an outer peripheral wall portion, the outer peripheral wall portion of each of said upper and lower half casings cooperating to define finger touch portions protruding from the outer peripheral wall portions, a pair of hubs around which a tape is wound and which are rotatably fitted into openings defined by circular peripheral wall portions projected from an inner surface of the flat surface wall portion of one of said cassette half casings, tape guide members formed in the cassette casing at positions through which the tape wound around the hubs is traveled, wherein the thickness of the flat surface wall portion and the thickness of the outer peripheral wall portion of the upper and lower half casings, including said finger touch portions, are uniform, a plurality of parallel linear ribs projected from the inner surface of the one of the half casings in the vicinity of the circular peripheral wall portions, said linear ribs including a center rib contiguous with said circular peripheral wall portions and extending on a line extending through centers of the openings defined by the circular peripheral wall portions, said linear ribs further including at least one pair of side ribs, each side rib disposed at an opposite side of said center rib and spaced therefrom at a predetermined distance to define spacings between said ribs, and elongate windows formed in said flat surface wall portion of said one of said cassette half casings at locations limited to said spacings between said side ribs and said center rib so that said center rib is continuous between said circular peripheral wall portions.

2. The tape cassette according to claim 1, wherein an amount of variation in the thickness of the flat surface wall portion and the outer peripheral wall portion is each 20% or less.

3. The tape cassette according to claim 1, wherein the width of the linear ribs is thinner than the thickness of the flat surface wall portions of the upper and lower half casings.

4. The tape cassette according to claim 3, wherein the upper and lower half casings have at least one of said windows in a space between the circular peripheral wall portions and between the parallel linear ribs.

5. The tape cassette according to claim 1, wherein ends of the ribs include supporting pieces which support respectively tape-movement controlling sheets in the upper and lower half casings.

6. The tape cassette according to claim 1, wherein a head house portion in each of the upper and lower half casings is constituted solely by tape guide pins, a center boss, shield plate supporting walls and pad receiving walls which form a head insertion recess in which a pad supporting plate and a pad are received, and partition walls for surrounding in part cassette position determining openings and capstan insertion holes, respectively.

* * * * *